US005658651A

United States Patent [19]

Smith et al.

[11] Patent Number: 5,658,651

[45] Date of Patent: Aug. 19, 1997

[54] FABRIC TREATMENT AND SOFTENER SYSTEM FOR IN-DRYER USE

[75] Inventors: James A. Smith, Chatham, Mass.; George W. Kellett, Cranford, N.J.

[73] Assignee: Creative Products Resource, Inc., North Caldwell, N.J.

[21] Appl. No.: 536,273

[22] Filed: Sep. 29, 1995

[51] Int. Cl.$^6$ .................................. B32B 7/00; D04H 1/58

[52] U.S. Cl. .............................. 442/59; 444/63; 444/102; 444/108

[58] Field of Search ..................................... 428/245, 265, 428/288, 289

[56] References Cited

U.S. PATENT DOCUMENTS

| | | | |
|---|---|---|---|
| Re. 28,969 | 9/1976 | Naito | 150/3 |
| 375,652 | 12/1887 | Scott . | |
| 1,885,133 | 11/1932 | Oppenheimer . | |
| 2,102,858 | 12/1937 | Schlumbohm | 296/46 |
| 2,316,386 | 4/1943 | Albrecht | 8/142 |
| 2,560,649 | 7/1951 | Hornaday | 15/208 |
| 3,151,345 | 10/1964 | Massop | 8/150 |
| 3,377,249 | 4/1968 | Marco | 8/115.6 |
| 3,632,396 | 1/1972 | Perez-Zamora | 117/76 P |
| 3,650,816 | 3/1972 | Rudy et al. | 117/109 |
| 3,686,125 | 8/1972 | Miller | 252/90 |
| 3,813,221 | 5/1974 | Stubits | 8/142 |
| 3,816,321 | 6/1974 | Kleinschmidt | 252/134 |
| 3,827,857 | 8/1974 | Boulus | 8/137 |
| 3,933,425 | 1/1976 | Grünewälder et al. | 8/142 |
| 3,936,538 | 2/1976 | Marshall et al. | 427/242 |
| 3,945,936 | 3/1976 | Lucas et al. | 252/95 |
| 3,989,638 | 11/1976 | Bradley et al. | 252/186 |
| 4,011,172 | 3/1977 | Marsan et al. | 252/187 R |
| 4,017,411 | 4/1977 | Diehl et al. | 252/186 |
| 4,110,498 | 8/1978 | Benjamin et al. | 428/35 |
| 4,118,525 | 10/1978 | Jones | 427/242 |
| 4,142,978 | 3/1979 | Murphy | 252/8.7 |
| 4,170,565 | 10/1979 | Flesher et al. | 252/93 |
| 4,188,304 | 2/1980 | Clarke et al. | 252/93 |
| 4,214,038 | 7/1980 | McCarty et al. | 428/411 |
| 4,239,639 | 12/1980 | Gilbert et al. | 252/90 |
| 4,242,377 | 12/1980 | Roberts et al. | 427/242 |
| 4,289,815 | 9/1981 | Lee | 428/35 |
| 4,362,638 | 12/1982 | Caskey et al. | 252/90 |
| 4,374,035 | 2/1983 | Bossu | 252/91 |
| 4,448,699 | 5/1984 | Barrat et al. | 252/8.75 |
| 4,532,063 | 7/1985 | Gueldenzopf | 252/90 |
| 4,613,446 | 9/1986 | Magyar | 252/91 |
| 4,740,326 | 4/1988 | Hortel et al. | 252/90 |
| 4,749,596 | 6/1988 | Evans et al. | 427/242 |
| 4,764,289 | 8/1988 | Trinh | 252/8.6 |
| 4,797,221 | 1/1989 | Gueldenzopf | 252/95 |
| 4,820,435 | 4/1989 | Zafiroglu | 252/90 |
| 4,824,582 | 4/1989 | Nayar | 252/8.75 |
| 4,834,900 | 5/1989 | Soldanski et al. | 252/88 |
| 4,839,076 | 6/1989 | Willman et al. | 252/90 |
| 4,946,617 | 8/1990 | Sheridan et al. | 252/91 |
| 5,055,215 | 10/1991 | Mains et al. | 252/90 |

FOREIGN PATENT DOCUMENTS

| | | |
|---|---|---|
| 0429172A1 | 5/1991 | European Pat. Off. . |

*Primary Examiner*—Helen Lee
*Attorney, Agent, or Firm*—Cushman Darby & Cushman IP Group of Pillsbury Madison & Sutro LLP

[57] ABSTRACT

A system for the softening or other treatment of fabric articles is provided which comprises a vented bag comprising a fastening system and flexible sheet releasably impregnated with an effective amount of a liquid fabric-treatment composition.

22 Claims, No Drawings

FABRIC TREATMENT AND SOFTENER SYSTEM FOR IN-DRYER USE

FIELD OF THE INVENTION

The present invention provides a fabric-treatment system comprising a vented plastic heat-resistant bag having an opening with a fastening system that enables closure of the bag, so as to enclose a flexible sheet impregnated with a liquid fabric-treating formulation, as well as a method for use of the bag and the related sheet. The invention particularly relates to a method for use of the fabric-treatment device to soften and/or otherwise treat fabrics, such as articles of clothing. More particularly, the present invention relates to a method of fabric softening and/or treatment that can be carried out in a rotary clothes dryer.

BACKGROUND OF THE INVENTION

Certain chemical compounds have long been known in the art to possess the desired quality of imparting softness to textile fabrics. The quality of "softness" or being "soft" is well defined in the art, and, as used herein, means that quality of the treated fabric whereby its handle or texture is smooth, pliable, and fluffy, and not rough or scratchy to the touch. Known generally as "fabric softeners," these compounds have long been used by homemakers in the laundry, and by the textile industry to soften a finished fabric.

Additionally, many of these compounds act as antistatic agents to reduce the "static cling" of the treated fabrics. Static cling is generally the phenomenon of a fabric adhering to another object or to parts of itself as a result of static electrical charges induced on the surface of the fabric. It can also cause the adherence of lint, dust, and other undesired substances to the fabric. It is noticeably present in unsoftened fabrics that are freshly washed and dried in an automatic hot air dryer. By softening and reducing the static cling of a fabric, it is more comfortable when worn. Such treated fabrics additionally are easier to iron, and have fewer hard-to-iron wrinkles.

Perhaps the most common fabric softeners and anti-static agents known in the art are cationic compounds, especially amines such as quaternary ammonium and imidazolinium salts. These compounds are widely marketed for home use in the form of liquid emulsions. They must be added to the laundry in the rinse cycle, not the wash cycle, because cationic fabric conditioners interact with anionic substances present in laundry detergents such as anionic surfactants and builder salts, thereby rendering both relatively ineffective. A commercial fabric conditioner of this type is Downy® (The Proctor & Gamble Company, Cincinnati, Ohio).

Another method of softening fabrics involves the utilization of impregnated nonwoven dry fabric softener sheets that are added to the dryer along with damp (wet) laundry. The ingredients are released largely in a nonuniform manner from the dry sheet into the laundry by the abrasive action of tumbling in contact with the laundry, moisture from the laundry and the heat of the dryer. In general, the composition coated on these sheets is composed of cationic softening agents, antistatic agents, dispersing ingredients to help provide a more uniform ingredient release and fragrance. A commercial dryer sheet of this type is Bounce@ (The Proctor & Gamble Company, Cincinnati, Ohio). The disadvantage with these dryer fabric softener sheets is their relative poor softening ability versus the liquid softeners that totally penetrate the laundry fabrics in the last rinse of the washing machine cycle.

It has previously been impossible to attain the benefits of a liquid fabric softener, i.e., greater softening ability and dispersibility, in the dryer using the dryer sheets. Moreover, using liquid fabric softeners in the washing machine last rinse cycle require all the articles in that laundry load to be softened. In some instances, the user may desire to control the softening of the clothing, in which case, the user must divide the laundry into those articles they desire to be softened and those they do not. This results in inconvenient expenditures of time in creating additional wash loads and drying time.

It is therefore an object of the invention to provide a method of softening fabric articles in the home automatic dryer with liquid fabric softener ingredients resulting in superior softening ability. It is a further object of the invention to provide a method of softening fabric articles without having to divide articles of clothing into multiple groups according to the softening and or treatment desired, thus incurring such inconveniences and disadvantages mentioned above. Additional objects of the present invention will become readily apparent to persons skilled in the art from the following discussion."

SUMMARY OF THE INVENTION

The present invention provides a fabric-treatment system that imparts softening, antistatic and/or other desirable properties to laundered, i.e., moistened (wet), fabric articles. The fabric treatment system of the present invention comprises a bag sized for containment and treatment of a moistened fabric article which bag comprises an opening having a reversible fastening system. The bag is heat resistant and comprises means such as pores, holes, slits, and the like, to allow escape of the moisture. These moisture releasing means will be collectively referred to as "vents" herein. The system further comprises a flexible, textile sheet impregnated or coated with an effective fabric-treatment formulation. Preferably, the fabric-treatment formulation comprises a fabric softening agent or other fabric conditioning or treating agent, an organic solvent, a dispersing agent, and water. The fabric treatment formulation further comprises a surfactant to enhance the delivery of the formulation to the fabric articles. The present flexible sheets are dimensionally stable, so that they can be readily dispensed by the user and added to the bag of the present invention in discrete units, along with moistened clothing or other fabric articles to be treated.

Thus, it is preferred that the fabric-treatment formulation of the present invention is a gelled or thickened liquid comprising (a) an effective amount of a dispersing agent; (b) a liquid vehicle selected from the group consisting of water, a water-miscible organic solvent and mixtures thereof; (c) at least one fabric treatment agent; and (d) a surfactant. The fabric-treatment formulation of the present invention is released from the sheet upon physical contact with the fabric articles, e.g., as when the fabric articles and the sheet are tumbled together in the bag.

The present invention also includes a method for depositing fabric treatment agents, such as softening agents, on wet fabrics in a rotary hot air dryer. In this embodiment of the invention, the method comprises placing one or more wet fabric articles and a suitably sized, impregnated, flexible sheet into the bag, closing the bag, and then subjecting the bag to an amount of agitation and/or heat effective to release the fabric-treatment formulation from the flexible sheet upon contacting the fabric articles. The sheet "tumbles" among the fabric articles, thus dispersing the fabric treatment composition evenly onto them. Thus contacted, the fabric articles are softened or otherwise treated by the formulation and dried as the moisture escapes via the vents in the bag. In a preferred aspect of the invention, the closed bag, containing the flexible sheet and the moistened fabric(s), can be placed in a rotary hot air clothes dryer to provide the effective amount of heat and/or agitation, or tumbling. As used herein, the term "dryer" refers to a rotary hot air dryer, which tumbles the clothes in a drum with hot air, usually at a temperature of about 40°–90° C., preferably at about 50°–95° C., for preselected periods of time. For example, about 15–45 minutes of tumbling are sufficient to release the fabric-treating composition from the sheet interior surface of the bag at these temperatures and to dry the fabric articles. The term "fabrics" or "fabric articles" encompasses not only clothing, but other items which are commonly laundered, including sheets, draperies, rugs, upholstery coverings, towels and the like.

Thus, the present invention provides a method for depositing fabric treatment agents such as softening agents on fabrics comprising (a) placing a wet fabric article in the aforesaid vented fabric-treatment bag along with the flexible sheet impregnated with the fabric-treatment formulation; (b) sealing the bag; and (c) tumbling the sealed bag and its contents in a dryer at a temperature effective to release the fabric-treatment composition and for a time effective to contact an effective amount of said released fabric-treatment composition with said fabric, so as to soften or otherwise treat said fabric while it is dried.

Although the present invention is exemplified primarily as a system which delivers one or more quaternary amine fabric-softening agents, the invention is also intended to encompass a system which can deliver a wide variety of fabric-treating agents or fabric-treatment agents. For example, an effective amount of one or more fabric-treatment agents selected from the group consisting of anti-creasing agents, anti-soil agents, anti-static agents, bacteriostatic agents, brightening agents, bodying agents, dyes, odor masking agents and fragrances, fiber emollients, finishing agents, germicides, lubricants, mildew- or moth-proofing agents, shrinkage controllers, sizing agents, a starch composition, a water repellant composition, a composition for conferring spot resistance, and mixtures thereof can be uniformly distributed throughout the present sheet, in conjunction with, or in place of, a fabric-softening agent such as a quaternary amine fabric-softening agent. When formulated in this manner, the present sheet is referred to as a "fabric-modifier" or "fabric-treatment sheet" instead of as a "fabric-softener" or "fabric-softener sheet."

The present invention, including the above-described embodiments and preferred versions thereof is more fully described in the following detailed discussion, wherein all percentages are by weight of the softening composition, unless otherwise noted.

DETAILED DISCUSSION OF THE INVENTION

A. Bag

The bags of the present invention may be formed from any flexible material which exhibits sufficient thermal stability for use in the rotary hot air dryer discussed above. Preferably, the bag will be formed from non-porous plastic film, non-woven fabric, and the like. For example, the outermost layer of the bag can be formed from polyethylene, polypropylene, polyamide or a multiple or layered complex comprising such materials. The bag will further comprise vents, e.g., mechanically-created pores or holes. The vents may also be in the form of "flaps" over pores or holes that will open and close in response to changes in the vapor pressure inside the bag, to allow escape of moisture from the wet fabric articles as they dry.

Preferably the bags suitable for use in the present invention will have dimensions ranging from about 18"×23" up to about 36"×40". The most preferred size of bag for use in the present invention range is from about 20"×28" to about 26"×30". These dimensions preferably result in the bag having a surface area in the range of about 1120 $in^2$, and most preferably from about 1120 $in^2$ to about 1560 $in^2$.

After use, the bag may be discarded, or if desired, it may be constructed of a suitable material to allow repeated usage in a plurality of cleaning cycles.

B. Flexible Sheet

Fabric materials useful in the present invention to form the flexible sheet are woven or, preferably, non-woven fibers that are generally adhesively or thermally bonded. Fibrous sheets having a web or corded fiber structure, or those which comprise fibrous mats in which the fibers are distributed haphazardly or in a random array can also be used. The fibers can be natural, such as wool, silk, jute, hemp, cotton, linen, sisal, or ramie; or synthetic such as rayon, cellulose ester, polyvinyl derivatives, polyolefins, polyamides or polyesters. Generally, any diameter or dernier of fiber is useful in the present invention. The non-woven cloth materials employed herein are not prone to tear or separate when used, for example, in an automatic dryer, due to the haphazard or random array of fibers in the non-woven material which impart excellent strength in all directions. Some examples of preferred non-woven cloth material useful as substrates in the present invention include 100% rayon sheets, known as Fabray® Nonwoven Fabric F-110 (40 gm), available from Stems Technical Textile Co., or as Brand #6129 from Scott Nonwovens; or 100% polypropylene sheets, known as NW-161, available from Kimberly Clark Co., Neenah, Wis.

C. Fabric Treatment Formulation

A fabric-treatment formulation useful in the invention can be prepared by mixing in the desired proportions a dispersing agent, water, an organic solvent, a softening or other treatment agent, a surfactant such as a nonionic or amphoteric surfactant, and stirring the mixture until a homogeneous composition forms. Preferably, the organic solvents are added to the water in a suitable vessel with agitation and the application of external heating. At about 75°–85° C., the dispersing agent, treatment agents, surfactants and any other adjuvants, such as fragrance and preservative, are added sequentially with continuous agitation.

1. Fabric-Softening Agents

The present fabric-treatment formulation will preferably include an amount of one or more fabric-softening agents. Many useful fabric-softening agents are known to the art, and are disclosed, for example, in U.S. Pat. Nos. 3,936,538, 4,566,980, and 4,581,385, disclosures of which are incorporated by reference herein. Fabric-softening agents are useful in the fabric-treatment formulation in amounts from about 2.5–25 weight percent, and more preferably from about 10–20 weight percent. Cationic fabric-softening agents are preferred for use in the fabric-treatment formulation.

One broad class of cationic softening or conditioning agents suitable for use in the fabric-treatment formulation can be referred to as quaternary amines, or "quats." These materials function to condition the dried fabrics and to reduce static cling and lint adherence. The fabrics are "softened" in that their sheen, loft, and/or hand-feel is improved by either subjective or objective evaluation. Additionally, any given softening agent or mixture thereof is selected so that it will not significantly stain or discolor the dried fabrics. Subclasses of quaternary mines are well known to those of skill in the art and include the monomethyl trialkyl quaternaries, imidazolinium quaternaries, dimethyl alkyl benzyl quaternaries, dialkyl dimethyl quaternaries, methyl dialkoxy alkyl quaternaries, diamido amine-based quaternaries and dialkyl methyl benzyl quaternaries preferably the "alkyl" moiety of these compounds is a ($C_8$–$C_{24}$)alkyl group and the quaternary(mine) is a chloride or methosulfate salt.

It is sometimes preferable, for convenience, to define the subclasses of aliphatic quaternary amines suitable for use in the fabric-treatment formulations structurally. For example, one useful subclass aliphatic quaternary amines maybe structurally defined as follows:

$$(R)(R_1)(R_2)(R_3)N^+X^-$$

wherein R is benzyl, or lower(alkyl) benzyl; $R_1$ is alkyl of 10 to 24, preferably 12 to 22 carbon atoms; $R_2$ is $C_{10}$–$C_{24}$-alkyl, $C_1$–$C_4$-alkyl, or ($C_2$–$C_3$)hydroxyalkyl, $R_3$ is $C_1$–$C_4$-alkyl or ($C_2$–$C_3$)hydroxyalkyl and X represents an anion capable of imparting water solubility or dispersibility including chloride, bromide, iodide, sulfate and methosulfate. Particularly preferred species of these aliphatic quats include n-$C_{12}$–$C_{18}$-alkyl-dimethylbenzylammonium chloride (myrisalkonium chloride), n-$C_{12}$–$C_{14}$-alkyldimethyl (ethylbenzyl) ammonium chloride (quaternium 14), dimethyl-(benzyl)ammonium chloride and mixtures thereof. These compounds are commercially available as the BTC series from Lonza, Fairlawn, N.J., e.g., BTC 2125M is a mixture of myrisalkonium chloride and quaternium-14, or as Variquat® B-343 from Sherex Chem. Co., Dublin, Ohio which is a dihydrogenated tallow methyl benzyl ammonium chloride. This class of quat is germicidal, and is preferably used in combination with at least one of the other quats disclosed hereinbelow.

Other useful aliphatic quats include those wherein both R and $R_1$ are ($C_8$–$C_{24}$)alkyl, e.g., the N,N-di-(higher)-$C_{10}$–$C_{24}$-alkyl-N,N-di(lower)-$C_1$–$C_4$(alkyl)-quaternary ammonium salts such as distearyl(dimethyl)ammonium chloride, dihydrogenated tallow(dimethyl)ammonium chloride, ditallow(dimethyl)ammonium chloride (Arquad® 2HT-75, Akzo Chemie, McCook, Ill.), distearyl(dimethyl) ammonium methylsulfate and di-hydrogenated-tallow (dimethyl)ammonium methyl sulfate (Varisoft® 137, Sherex).

Other useful quaternary ammonium antistatic agents include the acid salts of (higher(alkyl)-amido(lower)alkyl)-(dialkyl)-amines of the general formula:

$$[(A(C{=}O){-}Y{-}){-}N(R_1)(R_2)(R_3)]^+X^-$$

wherein A is a $C_{14}$–$C_{24}$ normal or branched alkyl group, Y is ethylene, propylene or butylene, $R_1$ and $R_2$ are individually H, $C_1$–$C_4$(lower)alkyl or ($C_1$–$C_3$)hydroxyalkyl or together form the moiety $-CH_2-CH_2YCH_2-CH_2-$, wherein Y is NH, O or $CH_2$; $R_3$ is the same as $R_1$ or is also [A(C=O)Y-], and X is the salt of an organic acid. Compounds of this class are commercially available from Croda, Inc., New York, N.Y., as the Incromate® series, e.g. Incromate® IDL [isostearamidopropyl(dimethyl)amine lactate], Incromate® ISML [isostearamidopropy(morpholinium) lactate] and Incromate® CDP [cocamidopropyl(dimethyl) amine propionate], or as Incrosoft® T-75 [Ditallowdiamido methosulfate (quaternium 53)].

Examples of preferred imidazolinium quaternaries include, but are not limited to, (methyl-1-tallow-amido) ethyl-2-tallow imidazolinium methyl sulfate, available commercially from Sherex Chemical Co. as Varisoft® 475; (methyl-1-oleylamido)ethyl-2-oleyl-imidazolinium methyl sulfate, available commercially from Sherex Chemical Co. as Varisoft® 3690; tallow dimethylammonium methosulfate, available commercially from Sherex Chemical Co. as Varisoft® 137; methyl bis (tallowamidoethyl)2-hydroxyethyl ammonium methyl sulfate available commercially from Sherex Chemical Co. as Varisoft® 222; tallow imidazolinium methosulfate (Incrosoft® S-75), and alkylimidazolinium methosulfate (Incrosoft® CFI-75), both available from Croda, Inc., New York, N.Y.

Other useful amine salts are the stearyl amine salts that are soluble in water such as stearyl-dimethylamine hydrochloride, distearyl amine hydrochloride, decyl pyridinium bromide, the pyridinium chloride derivative of the acetylaminoethyl esters of lauric acid, lauryl trimethyl ammonium chloride, decylamine acetate and bis[(oleoyl)-(5,8)-ethanoloxy]-tallow($C_{14}$–$C_{18}$)aminehydrogen phosphate (Necon® CPS-100) and the like.

2. Other Fabric-Treating Agents

One or more additional fabric-treating agents may be used in combination with, or in place of, the fabric-softening agent, as long as such additives do not interfere with the dispersal and softening and/or other treatment properties of the composition. When utilized in this manner, about 2.5–25%, preferably about 5–15% of total fabric-treating agents will be present in the aqueous dispersion from which the gelled sheet is formed.

Useful fabric-treating agents include the following:

Anti-creasing agents (also referred to as wrinkle-release agents) such as corn starch, polyvinyl acetate, and mixtures thereof;

Anti-soil agents (also referred to as soil-release agents) such as the polyacrylic polyvinyl alcohol compositions described in U.S. Pat. No. 3,377,249;

Anti-static agents including liquid anti-static agents such as the commonly-employed nonionic and anionic surfactants, as well as cationic amine surfactants such as tertiary or quaternary amines (many of the quaternary amine fabric softening agents described hereinabove provide some anti-static effect); particulate anti-static agents such as aluminum oxide and stearates such as aluminum stearate; and mixtures thereof;

Bacteriostatic agents including alkyl dimethyl benzylammonium chloride, dodecyl trimethyl ammonium chloride and mixtures thereof;

Brightening agents including bleaching agents such as those described in U.S. Pat. No. 4,532,063, sodium hypochlorite, calcium hypochlorite, hydrogen peroxide, sodium peroxide, sodium perborate, and potassium permanganate; enzymes; and the like. Useful brightening agents also include optical brighteners such as the disulfonated diaminostilbene compounds disclosed in U.S. Pat. No. 2,612,501, and the triazole compounds disclosed in U.S. Pat. No. 2,784,183;

Bodying agents such as carboxymethyl cellulose, hydroxyethylcellulose, starch, polyvinyl acetate and the like;

Dyes;

Fiber emollients including silicone fluids;

Finishing agents;

Fragrances such as rose oil, lavender, lilac, jasmine, vanilla, wisteria, lemon, apple blossom, or compound bouquets such as citrus, spice, aldehydic, woody, oriental, and the like;

Germicides include the halogenated salicylanilides, hexachlorophene, neomycin sulfate, benzalkonium quaternary compounds, and the like, as described in U.S. Pat. No. 3,650,816;

Lubricants such as polyoxyethylene sorbitan monolaurate and methyl oleate;

Mildew-proofing or moth-proofing agents such as dialkyl quaternary ammonium salts, e.g., distearyl dimethyl ammonium chloride;

Shrinkage controllers such as caustic soda used in mercerizing strength, water-soluble resinous precondensates, and glyoxal; and Sizing agents.

For a generic description of fabric treatment agents, see H. Speel and E. Schwarz, *Textile Chemicals and Auxiliaries*, 2d. ed. (Reinhold Pub. Corp. 1957).

3. Surfactants

One or more surfactants are included in the present fabric-treatment formulation, to assist in the formation of a uniform liquid dispersion, and to assist the dispersal of the formulation in the dryer. Nonionic surfactants or amphoteric surfactants are preferred for use in the present invention since they are compatible with the cationic fabric treating agents and can also act as adjunct fabric softeners. Minor but effective amounts of certain avionic surfactants may also be useful in the present invention to provide improved water-solubility and faster dissipation of the sheets in the dryer.

Nonionic surfactants useful in the present formulations include the condensation products of ethylene oxide with a hydrophobic polyoxyalkylene base formed by the condensation of propylene oxide with propylene glycol. The hydrophobic portion of these compounds has a molecular weight sufficiently high so as to render it water-insoluble. The addition of polyoxyethylene moieties to this hydrophobic portion increases the water-solubility of the molecule as a whole, and the liquid character of the product is retained up to the point where the polyoxyethylene content is about 50% of the total weight of the condensation product. Examples of compounds of this type include certain of the commercially-available Pluronic® surfactants (BASF Wyandotte Corp.), especially those in which the polyoxypropylene ether has a molecular weight of about 1500–3000 and the polyoxyethylene content is about 35–55% of the molecule by weight, i.e., Pluronic® L-62.

Preferred nonionic surfactants include the condensation products of $C_8$–$C_{22}$ alkyl alcohols with 2–50 moles of ethylene oxide per mole of alcohol. Examples of compounds of this type include the condensation products of fatty alcohols with 3–50 moles of ethylene oxide per mole of alcohol which are commercially available from Shell Chemical Co., Houston, Tex., as, i.e., Neodol® 23-6.5 ($C_{12}$–$C_{13}$ fatty alcohol condensed with about 7 moles of ethylene oxide), the PolyTergent® SLF series from Olin Chemicals or the Tergitol® series from Union Carbide, i.e., Tergitol® 15-S-15, which is formed by condensing about 15 moles of ethylene oxide with a $C_{11}$–$C_{15}$ secondary alkanol; Tergitol® TMN-6, which is the condensation product of about 6 moles of ethylene oxide with isolauryl alcohol (CTFA name: isolaureth-6), Incropol® CS-12, which is a mixture of stearyl and cetyl alcohol condensed with about 12 moles of ethylene oxide (Croda, Inc.) and Incropol® L-7, which is lauryl alcohol condensed with about 7 moles of ethylene oxide (Croda, Inc.).

Preferred nonionic fabric-softening agents also include ($C_8$–$C_{24}$) fatty acid amides, e.g., the monoamides of a mixture of arachidic and behenic acid (Kenamide® B, Humko Chem. Co., Memphis, Tenn.), and the mono- or di-alkanolamides of ($C_8$–$C_{22}$) fatty acids, e.g., the diethanol amide, monoethanol amide or monoisopropanolamide of coconut, lauric, myristic or stearic acid, or mixtures thereof. For example, Monamide® S is the monoethanol amide of stearic acid (Mona Industries, Inc., Patterson, N.J.), and Monamine ALX-100S (Mona Industries), is a mixture of the diethanol amide of cocoa fatty acid and the diethanol amide of dodecylbenzene sulfonic acid. Monamide® CMS (Cocamide MEA; Mona Industries, Inc., Paterson, N.J.) is also a useful member of this class of nonionic surfactants.

Other nonionic surfactants which may be employed include the ethylene oxide esters of $C_6$–$C_{12}$ alkyl phenols such as (nonylphenoxy)polyoxyethylene ether. Particularly useful are the esters prepared by condensing about 8–12 moles of ethylene oxide with nonylphenol, i.e., the Igepal® CO series (GAF Corp., New York, N.Y.).

Other useful nonionics include the ethylene oxide esters of alkyl mercaptans such as dodecyl mercaptan polyoxyethylene thioether, the ethylene oxide esters of fatty acids such as the lauric ester of polyethylene glycol and the lauric ester of methoxypolyethylene glycol, the ethylene oxide ethers of fatty acid amides, the condensation products of ethylene oxide with partially fatty acid esters of sorbitol such as the lauric ester of sorbitan polyethylene glycol ether, and other similar materials, wherein the mole ratio of ethylene oxide to the acid, phenol, amide or alcohol is about 5–50:1.

Useful amphoteric surfactants are known to the art, e.g., as disclosed in Marshall et al. (U.S. Pat. No. 3,936,538), the disclosure of which is incorporated by reference herein.

Useful anionic surfactants are known to the art, including sodium cocoyl isothionate, commercially available as Jordapon® CI from Mazer Chemicals, Gurnee, Ill. The artionic surfactant may be optionally added in minor by effective amounts, such that the total amount of surfactant, nonionic, amphoteric and anionic is from about 2 to about 5%.

4. Dispersing Agent

The present liquid fabric-treatment compositions will include an amount of a dispersing agent which is effective to uniformly distribute the ingredients of the formulation therein and to promote the release of the solvent and softening or treatment agent on the fabric articles while leaving no significant visible residue on the fabric. The dispersing agent can also assist in thickening or gelling the liquid dispersions when they are cooled and applied to the non-woven sheet. Any dispersing agent or mixture of dispersing agents can be used which stabilizes the fabric-treatment composition and assists in releasably adhering it to the flexible sheet. Useful dispersing agents can include modified starches, modified celluloses (CMC, HPMC), fatty acids and acid salts, fatty alcohols, polysaccharide gums, and modified mineral clays, e.g., modified bentonite available commercially as Korthix™ H from Kaopolite, Inc, Union N.J. or Bentone Mass., commercially available from RHEOX, Inc., Hightstown, N.J.

Preferred polysaccharide gums for use in the present compositions include vegetable gums, such as the alkali metal salts of alginic acid ("alginates"), carrageenan (preferably kappa-carrageenan), pectin, guar gum, and mixtures thereof. These "strong gums" re-gel from solution or dispersion to yield a continuous gel structure.

Other useful dispersing agents include polyvinylpyrrolidone, polyvinyl alcohol, polyacrylamides and polymeric organic waxes. The useful polymeric waxes include ethylene acrylate copolymers, ethylene acrylic acid copolymers and polyethylene (e.g., oxidized polyethylenes). These materials are commercially available in the form of aqueous emulsions or dispersions, e.g., from Allied Chemical, Morristown, N.J., as the A-C Copolymer and A-C Polyethylene series, such as A-C Copolymer 540, A-C Copolymer 580 and A-C Polyethylene 617 and 629. Waxy polyethylene glycols (PEG) such as those of a molecular weight of about 200 to 1700–2000 are preferred.

Other dispersing agents include the alkali earth metal, alkaline earth metal or ammonium salts of various naturally occurring or synthetic fatty acids. Useful fatty acids may be selected from one or more ($C_8$–$C_{22}$) fatty acids which incorporate 0–3 double bonds per fatty acid molecule, e.g., myristic acid, stearic acid, palmitic acid, lauric acid, behenic acid and the like. Alkali metal salts of fatty acids such as stearic acid are preferred. Commercially available salts of stearic acid can be used, e.g., the sodium stearate that is available from Witco Chem. Co. as Grade T-1. However, the stearate salt can be formed in situ in the liquid dispersion, by neutralizing stearic acid with a base such as an alkali metal hydroxide, e.g., LiOH, KOH, or NaOH, which may be added to the dispersion as an aqueous solution.

Preferably, about 10–20% of the dispersing agent or agents will be employed in the present fabric-treatment compositions.

5. Organic Solvent

The present fabric-treatment compositions are formed by dispersing the fabric softening and/or treating agent and dispersing agent in a solvent system which can comprise water and an organic co-solvent or solvent mixture. Preferably, the organic solvent or solvent mixture is non-toxic and water-miscible.

Most preferably, the major portion of the organic solvent will be a glycol ether. These materials are lower(alkoxy)- or lower(alkoxy)lower(alkoxy)-ethers of ethanol or isopropanol. Some examples of preferred glycol ethers are available under the trade names Arcosolv® (Arco Chemical Co.) or Cellosolve®, Carbitol®, or Propasol® (Union Carbide Corp.), and include, e.g., butylCarbitol®, hexylCarbitol®, methylCarbitol®, and Carbitol® itself, (2-(2-ethoxy) ethoxy)ethanol. The choice of glycol ether can be readily made by one of skill in the art on the basis of its volatility, water-solubility, wt-% of the total dispersion and the like. Pyrrolidinone solvents such as N-methyl-2-pyrrolidinone (M-Pyrol®) or 2-pyrrolidone (2-Pyrol®) can also be used. Minor amounts of alkanols such as isopropanol or n-butanol can also be included.

Alcohols which can be employed as co-solvents include liquid polyethylene glycols, i.e., polyethylene glycol-200, 300, 400 or 600, wherein the suffixed numbers indicate the approximate molecular weight of the glycol. Other useful co-solvents include other alcohols, for example: (a) lower (alkanols), such as ethanol, isopropanol, and n-butanol; (b) ketones such as acetone and methyl ethyl ketone; (c) $C_2$–$C_4$ polyols, such as a diol or triol, e.g., ethylene glycol, propylene glyol, glycerol or mixtures thereof or (d) hydrocarbon solvents such as isoparaffinic solvents (Isopar K).

The organic solvent is present in the fabric-treatment composition in an amount from about 2 to about 75 weight percent, more preferably in an amount of from about 30 to about 50 weight percent and most preferably from about 35 to about 40 weight percent.

6. Water

Depending upon the nature of the other components present in the fabric-treatment composition and their respective amounts, when water is present, the water content of the composition can range from about 10–55 weight percent, preferably from about 15–25 weight percent. Generally, sufficient water is employed to completely suspend the dispersing agent and other components to insure the preparation of a homogeneous fabric-treatment composition upon cooling.

7. Formulation

Therefore, the fabric treatment formulations used to form the present impregnated sheets will comprise, by weight, about 30–50% water-miscible organic solvent, preferably about 35–40% of a glycol ether or pyrrolidinone solvent; about 10–30%, preferably about 15–25% total water; about 2.5–25%, preferably about 15–20% of one or more fabric treatment agents; about 10–20% of a dispersing agent, about 2–5% of a surfactant, and optionally, a minor but effective amount of fragrance, e.g. <2%.

D. Formation of Impregnated Sheet

The fabric-treatment composition can be applied onto the flexible sheet, e.g., by casting the dispersion onto the flexible sheet, as by dipping, spraying, or brushing the dispersion onto the surface, or by pouring an amount of the fabric-treatment formulation on the flexible sheet and then "drawing down" the formulation with a metal rod or bar. The finished sheet may be perforated for division into smaller units, or simply cast into its end-use size. The individual sheets or a strip comprising a plurality of sheets separated by perforations may be packaged, e.g., using protective release sheets, in an appropriate dispensing unit. Following a cooling period, the finished fabric-treatment non-woven sheets are preferably packaged in moisture impermeable packaging, e.g., in foil, a foil-plastic film or a foil-treated paper composite envelope.

The following examples further illustrate the present invention and preferred embodiments thereof. It is to be understood, however, that these examples are for illustrative purposes only and are not intended to limit the scope of the specification or claims thereof in any way.

EXAMPLE I

Formulation of Fabric-Treatment Composition

A 1500 ml beaker was charged with 219.8 g distilled water. While mixing, 287.9 ml of polyethylene glycol (PEG-200) was added. 100 mL of 2-(2-ethoxy-ethoxy)ethanol (Carbitol LG®, Union Carbide Corp.) was added and the reaction mixture was heated to 85° C. While maintaining the mixture at 85° C., 120 mL of sodium stearate was added and the mixture stirred until all components were in solution. 21 g of cocamide MEA (Monamid CMA, Mona Industries, Inc., Paterson, N.J.) was added slowly into the beaker until entirely in solution. Fourteen grams of oleth-20 (Lipocol O-20) was then melted and added to the beaker, followed, sequentially at five minute intervals, by the addition of 143.4 g of quaternium-27 (Varisoft 475), 13.6 g of melted Varisoft 137, and 40.3 g Varisoft 222. Ten g modified bentonite (Bentone MA) was added slowly to this mixture until fully dispersed, followed by 15 g Korthix H, also stirred until fully dispersed. Finally, 15.00 g fragrance (3539-4113R) was added and the entire mixture stirred 15 minutes to ensure uniformity.

EXAMPLE II

Sheet Impregnation with Fabric Softener Formulation

The mixture prepared in Example I was applied to a 10"×10" non-woven sheet (Crown Textile #2927) to form the fabric-treatment non-woven, impregnated sheet. Specifically, the non-woven sheet was place on a metal plate and placed in a constant temperature oven (60° C.) along with a metal rod for drawing the product across the sheet. When the plate, sheet and rod were at 60° C., they were removed from the oven and 100 g of the fabric treatment composition prepared in Example 1 was poured onto the sheet close to the rod. The rod was subsequently quickly drawn down the length of the sheet, resulting in the uniform coating of the sheet.

Upon cooling, a finished, impregnated, fabric-treatment sheet was obtained, the surface of which was impregnated and stably coated with the fabric-treatment formulation.

The invention has been described with reference to various specific and preferred embodiments and techniques. However, it should be understood that many variations and modifications may be made while remaining within the spirit and scope of the invention.

What is claimed is:

1. A moist flexible sheet having an effective amount of a gelled or liquid fabric-treatment composition releasably absorbed thereinto, which composition consists essentially of a fabric-treatment agent; a dispersing agent present in an amount effective to stabilize the fabric-treatment composition onto the flexible sheet and to promote the release of the fabric-treatment composition on fabric articles while leaving no significant undesirable visible residue on the fabric article; and a liquid vehicle in an amount effective to suspend the dispersing agent and the fabric-treatment agent, which liquid vehicle is selected from the group consisting of water, an organic solvent, and mixtures thereof.

2. The flexible sheet of claim 1, wherein the dispersing agent is selected from the group consisting of modified starches, modified celluloses, fatty acids, fatty acid salts, fatty alcohols, polysaccharide gums, modified mineral clays, and mixtures thereof.

3. The flexible sheet of claim 1, wherein the liquid vehicle includes at least one glycol ether.

4. The flexible sheet of claim 1, wherein the liquid vehicle is a mixture of water and organic solvent.

5. The flexible sheet of claim 1, wherein the liquid vehicle is water.

6. The flexible sheet of claim 1, wherein the liquid vehicle is organic solvent.

7. The flexible sheet of claim 1, wherein the fabric-treatment agent is selected from the group consisting of anti-creasing agents, anti-soil agents, bacteriostatic agents, brightening agents, bodying agents, dyes, fiber emollients, finishing agents, fragrances, germicides, lubricants, mildew-proofing agents, moth-proofing agents, shrinkage controllers, sizing agents, and mixtures thereof.

8. The flexible sheet of claim 1, which composition consists essentially of about 2% to about 75% of the organic solvent, about 10% to about 55% water, about 2.5% to about 25% of the fabric-treatment agent, and about 10% to about 20% of the dispersing agent.

9. A moist flexible sheet having an effective amount of a gelled or liquid fabric-softener formulation releasably absorbed thereinto, which formulation consists essentially of a fabric-softening agent; a dispersing agent in an amount effective to stabilize the fabric-softening formulation onto the flexible sheet and to promote the release of the fabric-softening formulation on fabric articles while leaving no significant undesirable visible residue on the fabric article; and a liquid vehicle in an amount effective to suspend the dispersing agent and the fabric-softening agent, which liquid vehicle is selected from the group consisting of water, an organic solvent, and mixtures thereof.

10. The flexible sheet of claim 9, wherein the dispersing agent is selected from the group consisting of modified starches, modified celluloses, fatty acids, fatty acid salts, fatty alcohols, polysaccharide gums, modified mineral clays, and mixtures thereof.

11. The flexible sheet of claim 9, wherein the liquid vehicle includes at least one glycol ether.

12. The flexible sheet of claim 9, wherein the liquid vehicle is a mixture of water and organic solvent.

13. The flexible sheet of claim 9, wherein the liquid vehicle is water.

14. The flexible sheet of claim 9, wherein the liquid vehicle is organic solvent.

15. The flexible sheet of claim 9, which further includes at least one fabric-treatment agent selected from the group consisting of anti-creasing agents, anti-soil agents, bacteriostatic agents, brightening agents, bodying agents, dyes, fiber emollients, finishing agents, fragrances, germicides, lubricants, mildew-proofing agents, moth-proofing agents, shrinkage controllers, sizing agents, and mixtures thereof.

16. The flexible sheet of claim 11, which formulation consists essentially of about 2% to about 75% of the organic solvent, about 10% to about 55% water, about 2.5% to about 25% of the fabric-softening agent, and about 10% to about 20% of the dispersing agent.

17. A fabric-treatment kit comprising, packaged in association:

(a) at least one bag having an opening comprising a fastening system, and (b) at least one moist flexible sheet having an effective amount of a gelled or liquid fabric-treatment composition releasably absorbed thereinto, which composition consists essentially of a fabric-treatment agent; a dispersing agent in an amount effective to stabilize the fabric-treatment composition onto the flexible sheet and to promote the release of the fabric-treatment composition on fabric articles while leaving no significant undesirable visible residue on the fabric article; and a liquid vehicle in an amount effective to suspend the dispersing agent and the fabric-treatment agent, which liquid vehicle is selected from the group consisting of water, an organic solvent, and mixtures thereof.

18. The flexible sheet of claim 17, wherein the liquid vehicle is a mixture of water and organic solvent.

19. The flexible sheet of claim 17, wherein the liquid vehicle is water.

20. The flexible sheet of claim 17, wherein the liquid vehicle is organic solvent.

21. The flexible sheet of claim 17, wherein the fabric-treatment agent is selected from the group consisting of anti-creasing agents, anti-soil agents, bacteriostatic agents, brightening agents, bodying agents, dyes, fiber emollients, finishing agents, fragrances, germicides, lubricants, mildew-proofing agents, moth-proofing agents, shrinkage controllers, sizing agents, and mixtures thereof.

22. The flexible sheet of claim 17, which composition consists essentially of about 2% to about 75% of the organic solvent, about 10% to about 55% water, about 2.5% to about 25% of the fabric-treatment agent, and about 10% to about 20% of the dispersing agent.

* * * * *

UNITED STATES PATENT AND TRADEMARK OFFICE

CERTIFICATE OF CORRECTION

PATENT NO. : 5,658,651

DATED : August 19, 1997

INVENTOR(S) : Smith, et al.

It is certified that error appears in the above-identified patent and that said Letters Patent is hereby corrected as shown below:

On the title page,

Item [56], under U.S. PATENT DOCUMENTS insert

| | | | |
|---|---|---|---|
| --3,593,544 | 7/1971 | Henderson | 68/12 |
| 3,949,137 | 4/1976 | Akrongold et al. | 428/311 |
| 4,126,563 | 11/1978 | Barker | 252/8.8 |
| 4,336,024 | 6/1982 | Denissenko et al. | 8/142 |
| 5,062,973 | 11/1991 | Kellett | 252/8.75 |
| 5,066,413 | 11/1991 | Kellett | 252/8.75 |
| 5,077,119 | 12/1991 | Wraige | 428/190 |
| 5,145,595 | 9/1992 | Morris et al. | 252/91 |
| 5,173,200 | 12/1992 | Kellett | 252/8.8 |
| 5,238,587 | 8/1993 | Smith et al. | 252/8.6 -- |

UNITED STATES PATENT AND TRADEMARK OFFICE

CERTIFICATE OF CORRECTION

PATENT NO. : 5,658,651

DATED : August 19, 1997

INVENTOR(S) : SMITH, et al.

It is certified that error appears in the above-identified patent and that said Letters Patent is hereby corrected as shown below:

Item [56], under FOREIGN PATENT DOCUMENTS insert:

| | | |
|---|---|---|
| **–1,086,846A** | **5/1994** | **China** |
| **2,021,561** | **11/1970** | **German** |
| **2,460,239** | **7/1975** | **German** |
| **0,036,833** | **9/1981** | **Europe** |
| **0,498,433** | **8/1992** | **Europe** |
| **WO 92/17285** | **10/1992** | **PCT –** |

Signed and Sealed this

Twelfth Day of September, 2000

*Attest:*

Q. TODD DICKINSON

*Attesting Officer*

*Director of Patents and Trademarks*